United States Patent [19]
L'Heureux
[11] Patent Number: 4,940,113
[45] Date of Patent: Jul. 10, 1990

[54] METHOD OF ACOUSTICALLY INSULATING A TOILET BOWL

[76] Inventor: Ghislain L'Heureux, 911, rang St-Antoine, St Féréol Les Neiges, Quebec, Canada, G0A 3R0

[21] Appl. No.: 342,907

[22] Filed: Apr. 25, 1989

[30] Foreign Application Priority Data

Dec. 8, 1988 [CA] Canada .................................. 585333

[51] Int. Cl.[5] .............................................. F16F 15/00

[52] U.S. Cl. .................................... 181/296; 181/207; 4/252 R; 4/DIG. 9; 248/560; 248/634; 277/207 A; 277/DIG. 9; 285/58

[58] Field of Search ................................ 181/207-209, 181/296; 4/252 R, 254; 248/564, 632-634, 638, 560; 285/10, 56, 58, 59; 277/207 A, DIG. 9

[56] References Cited

U.S. PATENT DOCUMENTS

| | | | |
|---|---|---|---|
| 600,961 | 3/1898 | Burnett | 285/57 |
| 842,363 | 5/1907 | Watrous | 285/58 |
| 988,555 | 3/1911 | Donovan | 285/10 |
| 3,568,222 | 3/1971 | Gantzert | 4/252 R |
| 3,775,780 | 12/1973 | McEwen | 4/252 R |
| 4,406,480 | 9/1983 | Izzi | 285/12 |
| 4,482,161 | 11/1984 | Izzi, Sr. | 4/252 R X |
| 4,637,079 | 1/1987 | Hodge | 4/252 R X |

*Primary Examiner*—Benjamin R. Fuller
*Attorney, Agent, or Firm*—Bacon & Thomas

[57] ABSTRACT

Toilet bowls made of porcelain are conventionally disposed directly on the floor and/or attached thereto through rigid connections. When the toilet is used, acoustic vibratons are therefore transmitted from the bowl to the floor and spread all over the dwelling. In the case of a multiple unit residential building, the acoustic vibrations even reach the surrounding residential units and disturb their occupants. To overcome this drawback, the acoustically insulating method proposes to insert a strip of rubber foam between the base of the bowl and the floor and to attach the toilet bowl to the floor through a pair of fasteners each including a rubber link, whereby no acoustic short circuit is established between the bowl and floor to thereby considerably reduce the transmission of acoustic vibrations to the floor.

8 Claims, 2 Drawing Sheets

METHOD OF ACOUSTICALLY INSULATING A TOILET BOWL

BACKGROUND OF THE INVENTION

1. Field of the invention:

The present invention relates to a method of acoustically insulating a toilet bowl by mounting it on a building floor through acoustically insulating connecting members. The invention is also concerned with the combination of the floor, the toilet bowl, and the above acoustically insulating connecting members.

2. Brief description of the prior art:

Toilet bowls made of porcelain are conventionally disposed directly on the floor and/or attached thereto through rigid connections, thereby causing acoustic short circuits between the toilet bowl and the floor. When the toilet is used, acoustic vibrations are transmitted from the bowl to the floor and spread all over, for example, the dwelling. In the case of a multiple unit residential building, the acoustic vibrations even reach the surrounding residential units and disturb their occupants.

OBJECT OF THE INVENTION

The main object of the present invention is therefore to overcome the above discussed drawback of the prior art by eliminating any acoustic short circuit between the toilet bowl and the building floor, to thereby considerably reduce the transmission of acoustic vibrations to the floor.

SUMMARY OF THE INVENTION

More specifically, according to the present invention, there is provided a method of acoustically insulating a toilet bowl having a base resting on a building floor, comprising the steps of:

interposing a cushion of resilient, acoustically insulating material between the base of the toilet bowl and the floor, so that the bowl base rests on the floor through this cushion; and attaching the bowl base to the floor through at least one fastener including a link of resilient, acoustically insulating material.

As the toilet bowl and the floor are connected together through the cushion and the link both of resilient, acoustically insulating material, the cushion and link prevent transmission of acoustic vibrations from the toilet bowl to the building floor to thereby acoustically insulate the bowl.

The invention also relates to the combination with a building floor of a toilet bowl having a base resting on the building floor, the improvement therein comprising:

a cushion of resilient, acoustically insulating material interposed between the base of the toilet bowl and the floor, so that the bowl base rests on the floor through this cushion; and at least one fastener including a link of resilient, acoustically insulating material for attaching the base of the toilet bowl to the floor.

Again, as the toilet bowl and the floor are connected together through the cushion and the link both of resilient, acoustically insulating material, these cushion and link prevent transmission of acoustic vibrations from the toilet bowl to the building floor to thereby acoustically insulate the toilet bowl.

Preferably, the cushion is self-adhesive on both sides, whereby the upper self-adhesive side thereof adheres to the bowl base and the lower one to the floor. Accordingly, the bowl base is also attached to the building floor through this cushion.

The objects, advantages and other features of the present invention will become more apparent upon reading of the following non restrictive description of a preferred embodiment thereof given with reference to the accompanying drawings.

DETAILED DESCRIPTION OF THE PREFERRED EMBODIMENT

Figure 1:
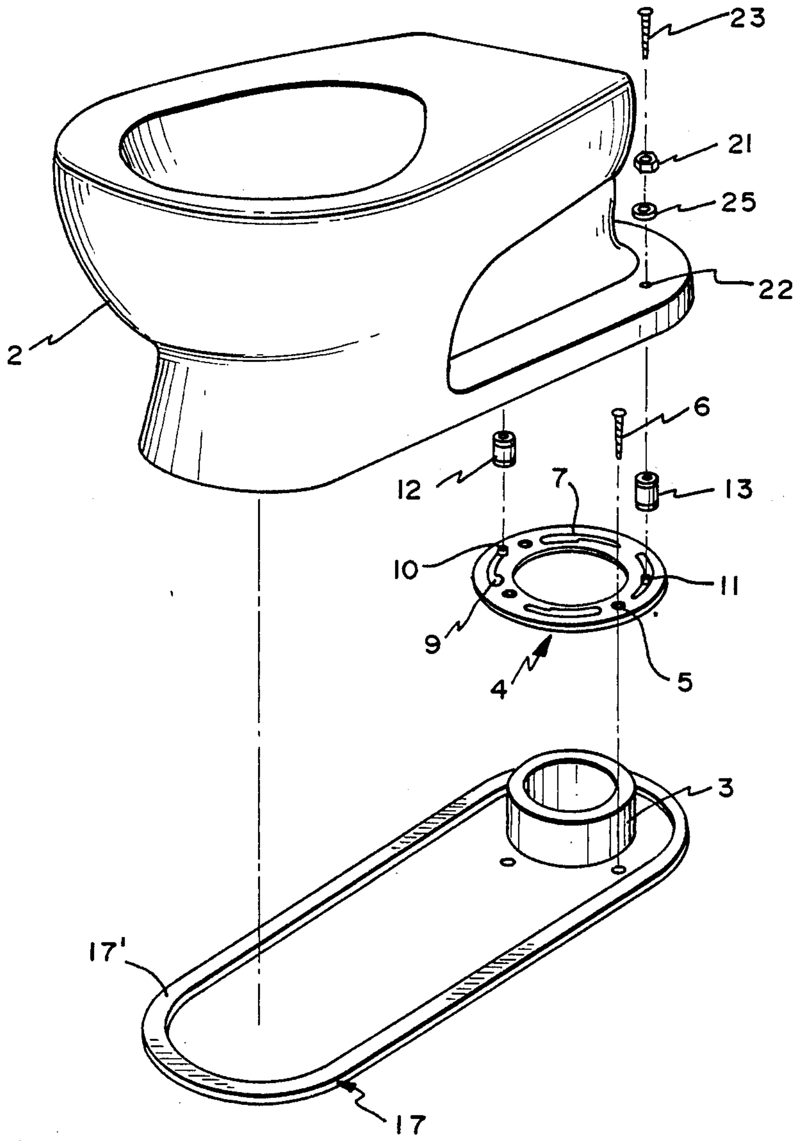
FIG. 1 is an exploded view showing the acoustically insulating mounting of the toilet bowl on the floor.
Figure 2:
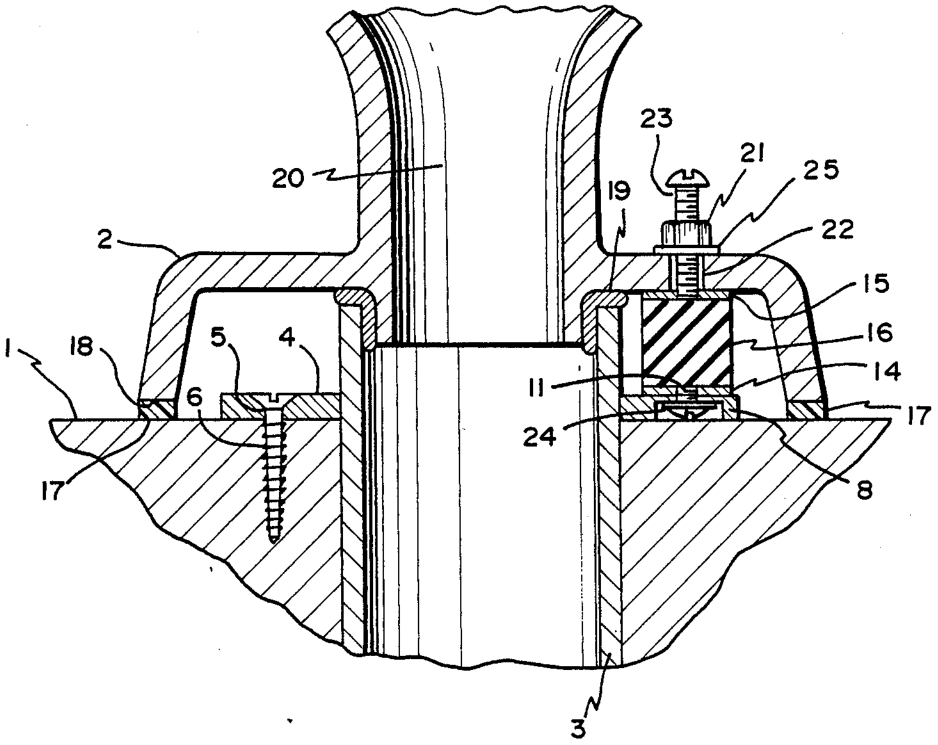
FIG. 2 is a cross-sectional view of the toilet bowl mounted on and acoustically insulated from the floor.

As illustrated in FIGS. 1 and 2, the floor 1 on which the toilet bowl 2 is mounted is traversed by a vertical, cylindrical waste drain pipe 3, which can be made for example of ABS (Acrylonitrile, Butadiene, Styrene) or of lead (Pb).

A flat ring 4 is provided with four circumferentially spaced, counter-sunk screw holes such as 5. The ring 4 can be screwed on the floor 1 around the pipe 3 by means of four screws such as 6 drived in the floor through the four counter-sunk holes 5, respectively. The screws 6 can be driven in wooden floors or in anchors in the case of masonry installations.

The base of the bowl 2 is attached to the ring 4 through two fasteners 12 and 13 each formed by two parallel, circular end washers 14 and 15 made of steel and provided with threaded central holes having a common geometrical axis. The washers 14 and 15 are interconnected together through a flexible, cylindrical rubber link 16. The washers 14 and 15 are attached to the respective ends of the rubber link 16 through a process of vulcanization of the rubber material, such a vulcanization process being of course well known in the art.

The flat ring 4 further comprises four arcuate slots such as 7 for attaching the base of the toilet bowl 2 thereto through the two fasteners 12 and 13. The slots 7 are partially recessed from their bottoms as at 8 (FIG. 2) and are provided with keyhole slot openings such as 9 (FIG. 1) at one end thereof. These allow the insertion of the heads of bolts 10 and 11 along with washers such as 24 positioned on these bolts, in the lateral, diametrically opposed slots 7 from the top of the ring 4 after the bolts 10 and 11 have been partially screwed in the corresponding washers 14. Before screwing the ring 4 to the floor 1, the washers and bolt heads are slid in the corresponding arcuate slots until they are in the proper positions, that is diametrically opposed, and the bolts 10 and 11 are then tightly screwed in the lower washers 14 of the respective fasteners 12 and 13 by means of a screwdriver. As can be seen in FIG. 2, the two washers 14 are then fixedly attached to the ring 4 through the respective bolts 10 and 11 and their associated washers 24.

After the bolts 10 and 11 have been tightly screwed, the screws 6 are driven to fix the ring 4 on the floor with the diametrically opposed fasteners 12 and 13 positioned to align the threaded central holes of their upper washers 15 with lateral holes such as 22 of the base of the toilet bowl 2.

To prevent formation of an acoustic short circuit between the bottom surface 18 of the bowl base and the floor 1 by resting this bottom surface 18 directly on the floor 1, a loop formed of a strip 17 of rubber foam is interposed between these surface 18 and floor 1, the strip 17 being self-adhesive on both sides thereof. To facilitate the installation, the upper self-adhesive side of the strip 17 is first applied on the bottom surface 18 of the bowl base.

After the strip 17 has been so applied on the bottom surface 18, the toilet bowl 2 is properly positioned on the floor 1 with a conventional, annular wax gasket 19 interposed between the upper end of the waste drain pipe 3 and a drain opening 20 of the toilet bowl 2 to the pipe 3. Of course, the pipe 3 is aligned with the opening 20, and the wax gasket 19 forms a sealing joint between these pipe 3 and opening 20 when pressed between them.

During positionment of the toilet bowl on the floor, the lower self-adhesive side of the strip 17 is also applied on the floor 1, which strip already having its upper self-adhesive side applied to the bottom surface 18 of the bowl base, whereby the base of the toilet bowl 2 is attached to the floor 1 through the strip 17 of rubber foam.

To complete the installation, one screws two bolts such as 23, with a nut such as 21 and a washer such as 25 thereon, in the threaded holes of the steel washers 15 of the fasteners 12 and 13 through the two holes 22 in the base of the toilet bowl 2. The nuts 21 are then adjusted on the bolts 23 to fixedly attach the bowl base to the upper washers 15 through the washers 25.

The bolts 23 and 10, 11 cannot contact each other to form an acoustic short circuit as the rubber link 16 between them is solid, that is with no cavity therein.

As can be appreciated, no direct mechanical and rigid connection exists between the bowl 2 and the floor 1, which would cause an acoustic short circuit between these bowl 2 and floor 1. On the contrary, the toilet bowl 2 is connected to the floor 1 only through the rubber foam strip 17 and the rubber links 16 of the fasteners 12 and 13, which strip and links absorb most of the acoustic vibrations which would otherwise be transmitted from the toilet bowl 2 to the floor 1.

It should be pointed out here that the foam rubber material constituting the strip 17 must be selected resilient and dense enough to support the weight of the bowl 2 without becoming compact and hard. This would result into the loss by the rubber foam of its properties of acoustic vibrations absorption.

In the same manner, the rubber material of the links 16 must be resilient enough to allow it to absorb acoustic vibrations.

The wax of the gasket 19 also acoustically insulates to some extent the toilet bowl 2 from the waste drain pipe 3, the latter being often in contact with the floor 1 itself. Of course the wax gasket can be replaced by a gasket made of a material with better acoustic insulation performances.

It is to be understood that the detailed form of the present invention herewith shown and described is to be taken as a preferred example of the same and that various changes in the shape, size and arrangement of parts may be resorted to without departure from the spirit of the invention or the scope of the subjoined claims.

What is claimed is:

1. A method of acoustically insulating a toilet bowl having a base resting on a building floor, comprising the steps of:

interposing a cushion of resilient, acoustically insulating material between the base of the toilet bowl and the said floor, so that the bowl base rests on the floor exclusively through the said cushion; and attaching said base to the floor exclusively through at least one fastener including a first rigid end, a second rigid end, and an intermediate link of resilient, acoustically insulating material, by attaching the first rigid end to the floor and the second rigid end to the base of the toilet bowl;

whereby the toilet bowl and the floor are connected together through the cushion and the link both of resilient, acoustically insulating material, the said cushion and link preventing acoustic short circuits between the toilet bowl and the floor and transmission of acoustic vibrations from the toilet bowl to the building floor to thereby acoustically insulate the said bowl.

2. The method of claim 1, wherein said resilient, acoustically insulating material of the cushion and of said fastener link comprises rubber.

3. The method of claim 2, in which said resilient, acoustically insulating material of the cushion comprises rubber foam.

4. The method of claim 1, wherein said base of the toilet bowl comprises a bottom surface on which the said base rests on the floor, the cushion comprises a first self-adhesive surface and said cushion interposing step comprises the steps of (a) applying said first self-adhesive surface of the cushion on the bottom surface of the bowl base, and (b) properly positioning said toilet bowl with the cushion applied thereto on the building floor.

5. The method of claim 4, wherein said bottom surface defines a closed loop, said cushion is in a form of a strip with a self-adhesive surface, and said self-adhesive surface applying step comprises applying said self-adhesive surface of the strip along the loop of the bottom surface so that said strip also defines a closed loop.

6. The method of claim 1, wherein said base attaching step further comprises (a) threadedly attaching the first rigid end of said fastener link to the floor, and (b) threadedly attaching the second rigid end of the fastener link to the base of the toilet bowl.

7. The method of claim 1, wherein said building floor is traversed by a waste drain pipe, and said toilet bowl comprises a drain opening to said pipe, said method further comprising the step of sealing a joint between the drain pipe and the bowl opening with gasket means made of acoustically insulating material.

8. The method of claim 4, wherein said cushion comprises a second self-adhesive surface, and wherein said toilet bowl positioning step comprises the step of applying said second self-adhesive surface of the cushion on the building floor whereby said bowl base is also attached to the floor through said cushion.

* * * * *